Feb. 12, 1924. 1,483,650
E. A. CORBIN, JR
VEHICLE BODY
Filed Sept. 18, 1922 2 Sheets-Sheet 1
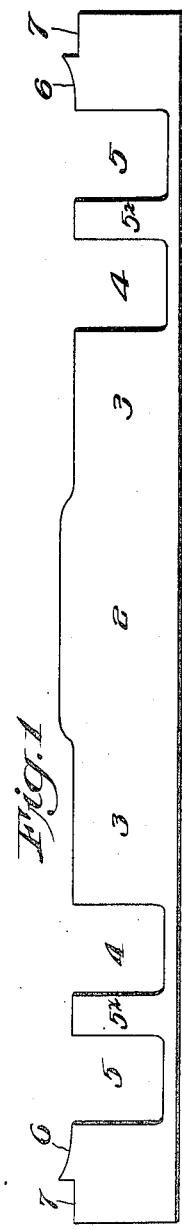
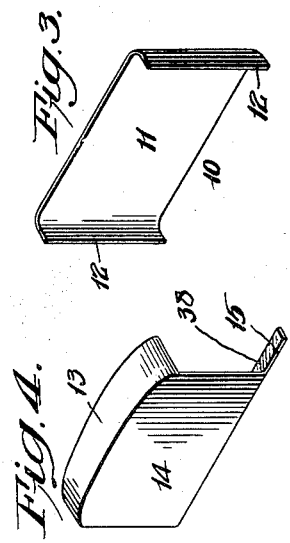
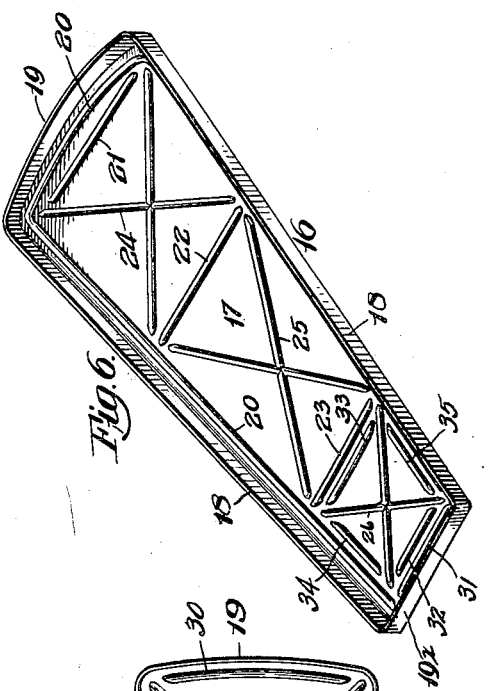
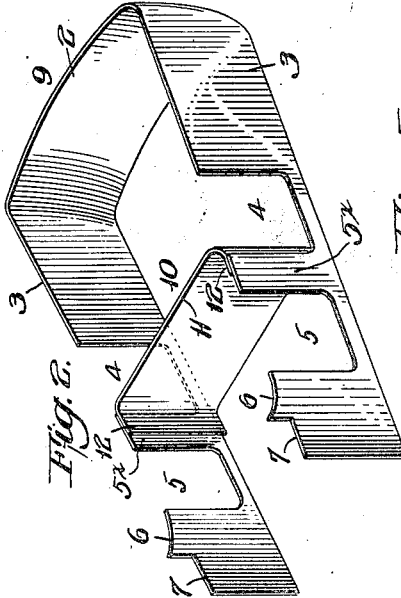
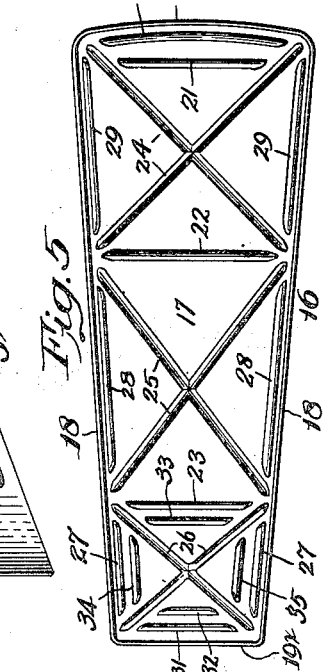
INVENTOR:
Elbert A. Corbin Jr.
BY
ATTORNEYS.

Feb. 12, 1924. 1,483,650
E. A. CORBIN, JR
VEHICLE BODY
Filed Sept. 18, 1922 2 Sheets-Sheet 2
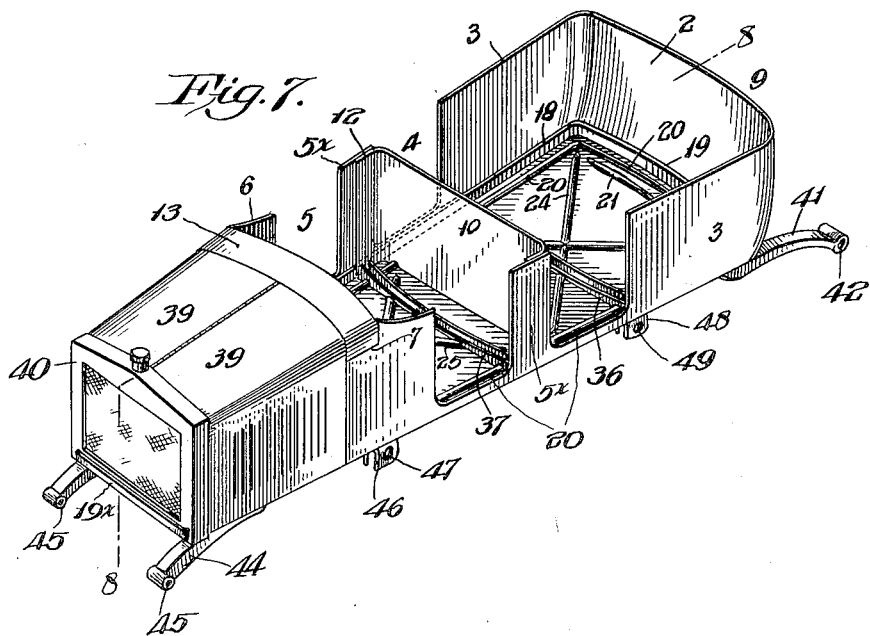
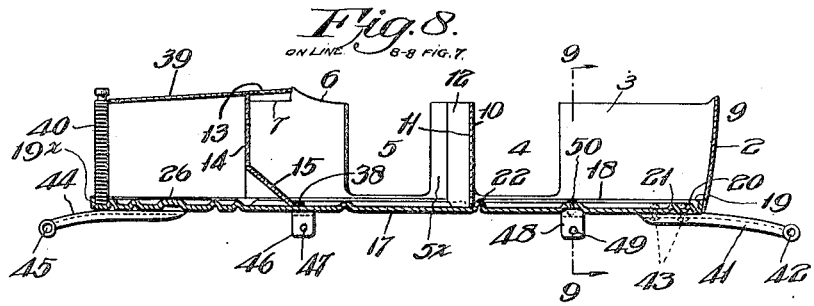
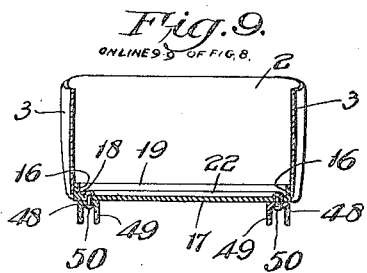
INVENTOR:
Elbert A. Corbin Jr.
BY
ATTORNEYS.

Patented Feb. 12, 1924.

1,483,650

UNITED STATES PATENT OFFICE.

ELBERT A. CORBIN, JR., OF SWARTHMORE, PENNSYLVANIA.

VEHICLE BODY.

Application filed September 18, 1922. Serial No. 588,753.

*To all whom it may concern:*

Be it known that I, ELBERT A. CORBIN, Jr., a citizen of the United States, residing at Swarthmore, in the county of Delaware, State of Pennsylvania, have invented a new and useful Vehicle Body, of which the following is a specification.

My invention consists of a novel vehicle body so constructed of sheet metal as to entirely eliminate the chassis now universally in use on self-propelled or other vehicles.

It further consists of a novel construction of a pressed or stamped metal automobile body, wherein the sides and back are pressed or stamped out of a suitable blank, as is also the cowl, front seat partition and the bottom, these parts being subsequently assembled and united by riveting, spot welding or the like, or by any other known means whereby a light, rigid, durable and cheaply manufactured vehicle body is produced especially adapted for self-propelled or other vehicles, means being provided for entirely eliminating the chassis now commonly employed.

To the above ends, my invention consists of the novel vehicle body hereinafter described.

For the purpose of illustrating my invention, I have shown in the accompanying drawings forms thereof which are at present preferred by me, since the same will give in practice satisfactory and reliable results, although it is to be understood that the various instrumentalities of which my invention consists may be variously arranged and organized and that my invention is not limited to the precise arrangement and organization of these instrumentalities as herein shown and described.

Figure 1 represents a plan view of a novel blank for an automobile body, embodying my invention.

Figure 2 represents a perspective view of said blank, after bending, pressing or stamping, showing the contour of the vehicle body after said blank has been bent, pressed, stamped or otherwise formed into the desired shape.

Figure 3 represents a perspective view of the front seat back in detached position.

Figure 4 represents a perspective view of the combined cowl, dash board and foot rest member in detached position.

Figure 5 represents a plan view of the bottom of the car body.

Figure 6 represents a perspective view of Figure 5, but showing a slightly different arrangement of the stiffening ribs or corrugations.

Figure 7 represents a perspective view of the completed vehicle body showing the hood, cowl, spring supports and their adjuncts, in assembled position.

Figure 8 represents a section on line 8—8 Figure 7.

Figure 9 represents a section on line 9—9 Figure 8.

Similar numerals of reference indicate corresponding parts.

Referring to the drawings:—

In carrying out my invention, I first construct a blank or strip 1 of suitable sheet metal, the central portion 2 thereof constituting the back of the car body and the portions 3 constituting the sides thereof, said sides being cut as indicated at 4 and 5 to form the door openings, between which are the upright portions $5^x$. Near each end of the blank 1 is the curved top edge 6 and the terminal top edge 7 extends substantially parallel to the bottom edge 8 of the blank. The blank seen in Figure 1 having been produced by any suitable mechanism, which it is unnecessary to describe in detail, is next pressed, stamped or otherwise formed into the contour of the vehicle body 9 seen in Figures 2 and 7. The back of the front seat is indicated at 10, and is best seen in Figure 3, said back comprising the body portion 11 and the vertical side flanges 12, which are pressed, stamped or otherwise formed out of thin sheet metal and fastened to the inner surfaces of portions $5^x$ of the sides 3 by any suitable means, as riveting, spot welding or the like, said back effectively bracing and reinforcing the intermediate portions of the tonneau or vehicle body.

The cowl seen detached in Figure 4 comprises the cowl proper 13 and the dash board 14, from the bottom of which latter the foot rest 15 inclines inwardly and terminates in the foot or bottom flange 38, as will be understood from Figures 4 and 8, it being apparent that both the back 10 seen in Figure 3, and the cowl, dash-board and foot rest seen in Figure 4, may be formed from a suitable blank by a single stamping or pressing operation.

The bottom 16 of the vehicle body is preferably constructed as seen in Figures 5 and 6 and comprises the bottom or base member 17 and the upturned side flanges 18, the rear flange 19 and the front flange 19ˣ, as will be understood from Figures 5 and 6.

The bottom 17 is provided with stiffening ridges or corrugations which may extend continuously parallel with the side flanges 18 and the rear flange 19 as indicated at 20 in Figure 6, and at right angles thereto, as indicated at 21, 22 and 23. I provide other stiffening ridges or corrugations, and in addition I provide diagonally arranged strengthening ridges or corrugations as indicated at 24, 25 and 26, which are positioned at the rear, middle and front portions of the bottom 17.

In the construction of the base member seen in Fig. 6, I have as stated shown the outer strengthening rib 20 as being continuous and extending around the sides and back of the base member 16, but it will be understood that if desired, said outer strengthening rib 20 may be interrupted as seen in Figure 5, and consists of the separate side strengthening ribs 27, 28 and 29, which are duplicated on each side, and the rear rib 30, the collocation of which will be understood from Figure 5.

The other transverse strengthening ribs as 21, 22 and 23 and the diagonal ribs 24, 25 and 26 in Fig. 5, are positioned substantially as seen in Figure 6. The front transverse ribs 31, 32 and 33 and the inner longitudinal front side ribs 34 and 35 are collocated substantially the same in both Figures 5 and 6.

It will of course be understood that the strengthening or reinforcing ribs may be somewhat differently arranged from the construction seen in Figures 5 and 6, without departing from the spirit of my invention.

By the foregoing construction, a very rigid and durable bottom member is produced, and when the flanges 18 and 19 are assembled within the body 9, as seen in Figures 7 and 8, and are riveted, spot-welded or otherwise secured in position, it will be evident that a very rigid, durable and efficient vehicle body will be produced, since the same is reinforced at its bottom by the flanges 18 and 19 and at its central portion by the transverse back 10 and at its front by the dash, cowl and foot rest member 13, 14 and 15, and there will be no liability of the body buckling or warping transversely or longitudinally under any conditions of use.

The manner of assembling the front seat back will be apparent from Figures 2, 7 and 8, and the assembling of the cowl 13 will be apparent as the ends thereof are fitted upon the terminal top edges 7 and properly secured thereto, so that the body is braced, reinforced and stiffened at its central portions, bottom, front and back ends, as is evident.

Referring now to Figure 7, it will be apparent that for further rigidity, I may employ the additional transverse strengthening rear and front channel beams 36 and 37, which I have shown in Figure 7 in their preferred location, said channel beams being very light and rigid and being secured in position at substantially the points seen in Figure 7, by riveting, spot-welding or other means, said transverse channel beams being omitted from Fig. 8 for clearness of illustration.

The relative position of the cowl 13, dash board 14 and the foot rest 15 when assembled will be understood from Fig. 8, and it will be apparent that the transverse foot or bottom terminal flange 38 of the foot rest, seen in Fig. 8, may be riveted, spot-welded or otherwise secured to the bottom 17, as will be understood from Figure 8, thereby constituting another effective transverse bracing or stiffening member.

The position of the hood 39 when the same is assembled will be understood from Figures 7 and 8, as well as the position of the radiator 40, said hood and radiator being of any usual standard or conventional type.

In Figs. 7 and 8, the rearwardly projecting arms or horns 41 are shown, whose outer ends are provided with eyes 42 and whose inner ends are preferably riveted or otherwise secured to the base 17 by means of rivets or other fastening devices 43.

The front arms or horns 44 seen at the left of Figs. 7 and 8 are each provided with the eye 45 at their front ends, their rear ends being secured to the front under portion of the base member 17, as will be understood from Fig. 8, by riveting in substantially the same manner as the rear horns 41.

The front brackets 46 are provided with the eyes 47, and are suitably riveted to the base member at about the points indicated in Figures 7 and 8, and the rear brackets 48 having the eyes 49 therein are also riveted to the under side of the body at substantially the points 50 seen in Figures 7 and 8.

It will be understood that the front eyes 45 and 47 are utilized as attaching points for the front springs and the rear eyes 42 and 49 are utilized as attaching points for the rear springs.

By my invention, it will be apparent that a very cheap, durable and rigid vehicle body is produced at a minimum expense, and the parts of the same when assembled are so constructed that when they are collocated and secured in the manner shown, the various elements serve as reinforcing devices for the other parts.

It will be seen that the sides 3 as well as the side flanges of the base 16 are shown as converging slightly towards the front, as is customary, but said sides obviously may be parallel, if desired. By my invention, it will be apparent that the chassis, as commonly employed, is dispensed with, and while my novel tonneau or vehicle body is especially adapted to an electrically propelled vehicle, it is capable of various other adaptations, as is evident.

It will be understood that in practice the bottom 16 is preferably formed of somewhat thicker metal than the blank 1 in order to insure the requisite rigidity therefor.

It will also be understood that if desired, the rear portion of the bottom may be concave so as to accommodate the housing of the rear axle so as to permit the center of gravity of the body to be as near the ground as may be desired.

Having thus described my invention, what I claim as new and desire to secure by Letters Patent is:—

1. The herein described blank for the sides and back of a vehicle body, comprising a strip having a solid central portion adapted to form the back, side members having cut-out portions forming door openings when the blank is bent at two points and the sides moved toward each other, and front upper cut-out terminal edges forming angular cowl supports when the blank is bent.

2. The herein described bottom for an automobile body, comprising a pressed or stamped metal member, having continuous upwardly extending side and rear flanges, and being provided with longitudinal, transverse and diagonal stiffening corrugations or ribs.

3. The herein described automobile body, comprising sides and back, a bottom having peripheral side and rear flanges, a transverse intermediate member forming a front seat back, front and rear horns having eyes therein secured to said bottom, and front and rear brackets having eyes therein also secured to said bottom, said front and rear eyes of said brackets and horns forming spring attaching points.

4. A vehicle body, provided with a back and sides, having cut-outs portions for side door openings, a front seat back having its ends secured to points on said sides between said door openings, a cowl, dash and foot rest member secured to the front of said sides, a bottom having side and rear flanges secured to the sides and back of said body, and a bottom flange for said foot rest secured to said bottom.

5. A vehicle body, provided with a back and sides having cut-out portions for side door openings, a front seat back having its ends secured to said sides between said door openings, a cowl, dash and foot rest member secured to the front of said sides, a bottom having side and rear flanges secured to the sides and back of said body, and a bottom flange for said foot rest secured to said bottom, in combination with front and rear horns having eyes therein secured to said bottom, and front and rear brackets also having eyes therein secured to said bottom, said front and rear eyes forming spring attaching points.

6. The herein described bottom for an automobile body comprising a pressed or stamped metal member having front, rear and side flanges for attachment to said body, and a plurality of transverse and diagonal stiffening ribs.

7. The herein described automobile body comprising sides and a back the latter being formed from a sheet metal blank, bent into substantially a U-shape, and a bottom substantially conforming to the contour of said body and back secured in the lower portion of said body and provided with peripheral side and rear flanges in engagement with the lower edge of said body.

8. The herein described automobile body comprising sides and a back, a bottom having peripheral side and rear flanges secured to said body, and a transverse intermediate member forming a front seat back having its ends secured to said sides.

9. The herein described automobile body comprising sides and a back, a bottom having peripheral side and rear flanges secured to said body, a transverse intermediate member forming a front seat back having its ends secured to said sides, and a combined cowl and dash member secured to the front of said body.

10. A vehicle body provided with a back and sides having cut out portions for side door openings, a transverse front seat back having its ends secured to said sides between said door openings, a combined cowl, dash and foot rest member secured to the front of said sides, and a bottom having peripheral side and rear flanges secured to the sides and back of said body.

11. A vehicle body provided with a back and sides formed from a blank having cut out portions for side door openings, a transverse front seat back having its ends secured to said sides between said door openings, a combined cowl, dash and foot rest member secured to the front of said sides, and a bottom having peripheral side and rear flanges secured to the sides and back of said body, in combination with front and rear horns having eyes therein secured to said body, and front and rear brackets also having eyes therein secured to said body.

12. The combination of a sheet metal chassisless vehicle body, front and rear horns attached to said body, and front and rear brackets also attached to said body, said horns and brackets serving as spring attachment points.

13. A chassisless automobile body, constructed of a sheet metal back and sides, front and intermediate transverse members secured to said sides, front and rear horns projecting from said body and front and rear brackets also attached to said body, the front and rear pairs of said horns and brackets serving as spring attaching points for the front and rear springs.

14. An automobile body comprising sheet metal sides and back, a bottom substantially conforming to the contour of said body and secured to the lower portion thereof, a transverse intermediate member forming a front seat back and having its ends secured to said sides, a transverse front member secured to the front of said body, front and rear horns attached to said body and front and rear brackets also attached to said body, the front and rear pairs of said horns and brackets serving as spring attaching points for the front and rear springs.

ELBERT A. CORBIN, Jr.

Witnesses:
  E. A. CORBIN,
  E. HAYWARD FAIRBANKS.